PEAK DETECTING CIRCUIT WITH COMPARISON MEANS PRODUCING A PEAK INDICATIVE SIGNAL

Filed Jan. 25, 1967 2 Sheets-Sheet 1

Inventors,
Gerhard O. Mietz,
William C. Earl,
by Francis K. Doyle
Their Attorney.

Inventors,
Gerhard O. Mietz,
William C. Earl,
by Francis X. Doyle
Their Attorney.

United States Patent Office 3,489,921

Patented Jan. 13, 1970

3,489,921

PEAK DETECTING CIRCUIT WITH COMPARISON MEANS PRODUCING A PEAK INDICATIVE SIGNAL

Gerhard O. Mietz, Somersworth, and William C. Earl, Dover, N.H., assignors to General Electric Company, a corporation of New York Filed Jan. 25, 1967, Ser. No. 611,705
Int. Cl. H03k 5/20
U.S. Cl. 307—235 9 Claims

ABSTRACT OF THE DISCLOSURE

A circuit for detecting peaks is disclosed comprising a switching differential amplifier with a first input and a second input. An input circuit receiving voltage varying input signals is connected to the first input through a first diode and an RC integration network in parallel with a base-emitter circuit of a first transistor. The input circuit is connected to the second input through a second diode. The output of the switching differential amplifier is applied to a second transistor through an RC differentiation circuit to produce an impulse function coincident in time with selected peaks in the input signal.

BACKGROUND OF THE INVENTION

The invention relates to a circuit for detecting peaks in an electrical signal; more particularly, it relates to a circuit for detecting peaks on a selective basis.

In any system in which voltage varies, it may be desirable to detect a peak in a voltage in order to perform a control function or to monitor the operation of the system to assure design performance. The prior art peak detectors capable of performing the control or monitoring functions have been indiscriminate in the detection of peaks of excessively short, excessively long, and intermediate durations, with the result that the prior art detectors were subject to false detection on the basis of noise and ambient peaks.

Furthermore, the prior art peak detectors were insensitive to a wide range of amplitude variation thereby rendering the use of such peak detectors impractical in many applications. Since the prior art peak detectors were insensitive to a wide range of amplitude variation, a plurality of individually designed peak detectors were utilized in a single system to obtain peak detection for all amplitudes. The net result was an increased cost due to the multiplicity of detectors and the requirement of individual design for each detector.

SUMMARY OF THE INVENTION

It is an object of this invention to provide a selective peak detector insensitive to noise and ambient peaks.

It is a further object of this invention to provide a peak detector which is effective throughout a wide amplitude range.

Briefly stated, in accordance with one aspect of this invention, there is provided a peak detector comprising a signal comparison means with first and second inputs comparing a first component of an input signal as operated upon by a first rectifying means and an integration means and a second component of the input signal. The first component is further operated upon by a switching means and a connective means which maintain the proper signal relations at the first and second inputs to allow detection of a peak as indicated by a change in state of the switching means.

In accordance with a specific embodiment of this invention, an output switching means is connected to the output of the signal comparison means through a differentiating circuit. The output of the switching means produced thereby is an impulse function coincident with each peak in the input signal and the change in state in the switching means.

BRIEF DESCRIPTION OF THE DRAWINGS

The specification concludes with claims particularly pointing out and distinctly claiming the subject matter which is regarded as the invention. The invention may also be understood from the following description taken in connection with the accompanying drawings in which:

DESCRIPTION OF THE PREFERRED EMBODIMENT

Figure 1:
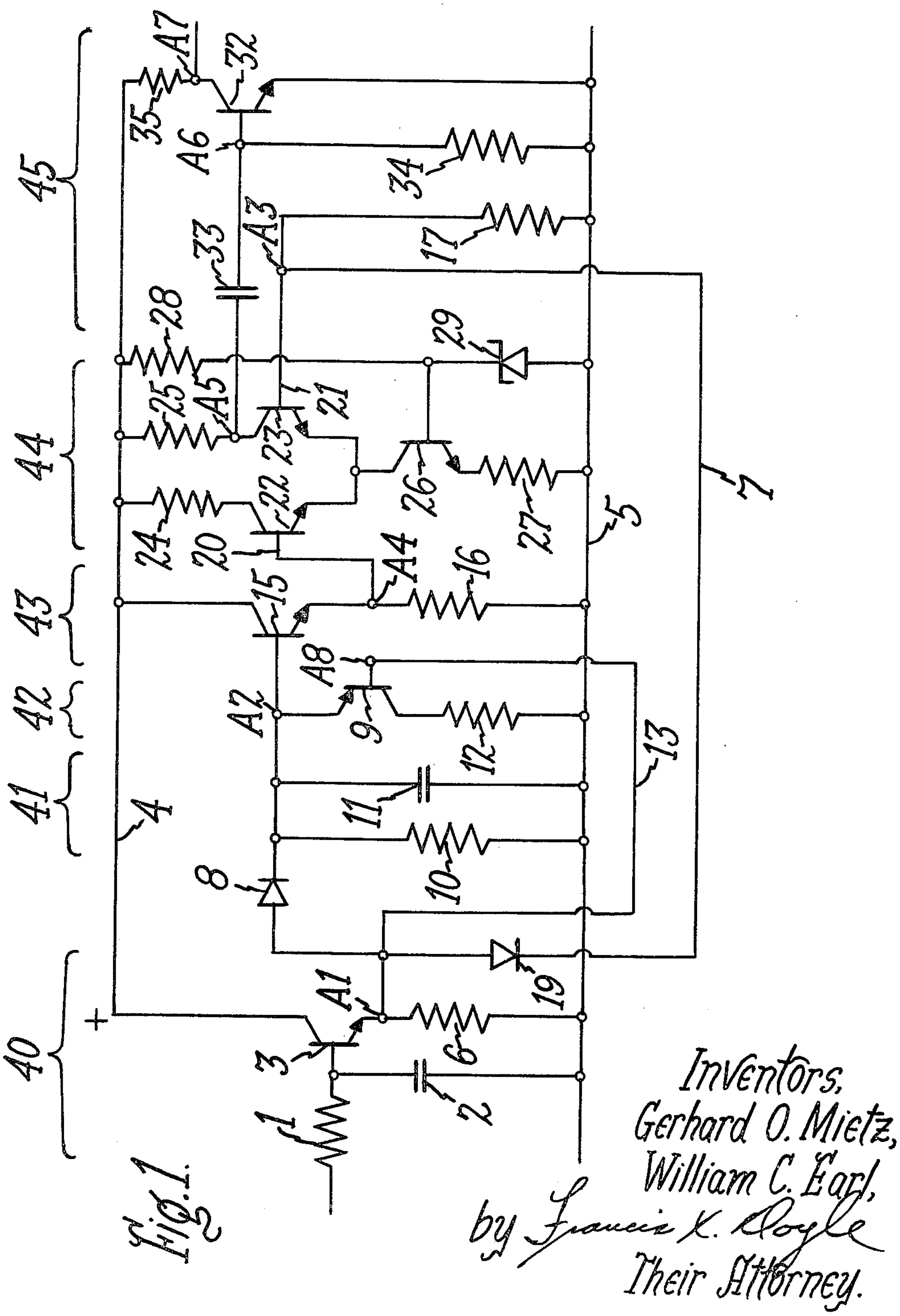
FIGURE 1 is a schematic of an embodiment of the invention.

Referring now to FIGURE 1, a peak detector is shown wherein a signal comparison means 44 is provided to compare peak indicative components of a signal received at a noise eliminating input circuit 40. A first component is integrated by an integrating network 41 having negligible effect upon ambient peaks and subjected to the operation of a switching means 42 and a connective means 43 and then compared to a second component upon which a comparable operation has not occurred. The signal comparison means 44 senses the components and applies peak indicative information to an output circuit 45 generating peak indicative responses.

As shown in FIGURE 1, the input circuit 40 is provided which includes an RC low pass filter combination comprising a resistor 1 and a capacitor 2 in order to avoid the detection of noise or peaks of excessively short duration. In this way, the resistor 1 and the capacitor 2 provide one aspect of the selectivity required of the peak detector, namely, the elimination of all noise peaks.

In order to avoid line loading, the input circuit also includes a common emitter configuration including a first NPN transistor 3 and an emitter resistor 6. The transistor 3 is maintained in a state of conduction by connecting a collector terminal to a positive D-C bus 4 and by connecting an emitter terminal A1 to a common bus 5 through the emitter resistor 6.

The input signal at the emitter terminal A1, which signal now comprises peaks of long and intermediate duration, is then divided. The first component is applied to the switching means 42 comprising a PNP transistor 9 at an output or emitter terminal A2 through a first rectifying means comprising a diode 8. The input signal is also applied to a control or base terminal A8 of transistor 9 through a lead 13. A collector resistor 12 for transistor 9 is connected to the common bus 5.

The peak of the signal as applied to the emitter terminal A2 is operated upon by the integration means 41 comprising a resistor 10 and a capacitor 11 which are connected in parallel between the terminal A2 and the common bus 5. In order to provide a second selective aspect for the peak detector, the resistor 10 and the capacitor 11 are chosen so as to allow a peak of long duration or ambient peak to maintain approximately equal amplitude at the terminal A1 and the terminal A2 and thereby avoid detection. The proper choice of the resistor 10 and the capacitor 11 will thereby eliminate the detection of ambient peaks.

The first component of the signal is next applied to the connective means 43 to be subjected to a base-emitter voltage drop at an NPN transistor 15. The operation of connective means 43 is controlled by the bias on the transistor 15 which is connected to the bus 4 at the collector terminal and is connected to the bus 5 at an emitter terminal A4 through an emitter resistor 16. The signal available at the emitter terminal A4 is then applied to a first input 20 of a signal comparison means 44.

A second component of the signal available at the input terminal A1 is applied directly to a second input 21 of the signal comparison means 44 at terminal A3 through a rectifying means comprising a diode 19 and lead 7 which connects the terminal A1 and the terminal A3.

The signal comparison means 44 as shown comprises a switching differential amplifier including a first NPN transistor 22 with a base terminal forming the first input 20 and a second NPN transistor 23 with a base terminal connected to the common bus 5 through a resistor 17 and forming the second input 21. The base terminal of transistor 22 is connected to common bus 5 through resistor 16. The collectors of the transistors 22 and 23 are connected to the D-C supply bus 4 through resistors 24 and 25, respectively. The emitters of transistors 22 and 23 are tied together and connected to the common bus 5 through the collector-emitter circuit of an NPN transistor 26 and a series-connected resistor 27. The transistor 26 is maintained in the conducting state by a voltage divider combination connected to the base of the transistor 26 and comprising a resistor 28 and a voltage-regulating Zener diode 29.

The signal available at a collector terminal A5 of the transistor 23 is a pulse function with pulsation occurring between a peak and a valley of the input signal. The pulse available at the terminal A5 is applied to a control terminal of a switching means in the output circuit 45 which comprises an NPN transistor 32 and a differentiating circuit including a capacitor 33 and a resistor 34. The resulting signals available at a control or base terminal A6 of the transistor 23 are A-C pulses with a positive polarity pulse corresponding to a peak. The consequent output from a collector terminal A7 of the transistor 32 which has a collector resistor 35, is an impulse function indicating the presence of a peak at the terminal A1.

In order to achieve peak detection, it is necessary that the signals available at the terminals A1, A2, A3 and A4 maintain approximate predetermined relationships in order to obtain a meaningful signal from the signal comparison means 44. The relationships will be maintained if the forward voltage drop across the diode 8, the diode 19, and the emitter-to-base circuits of transistors 9 and 15 are substantially equal. For this reason, the elements must be chosen so as to approximately satisfy the following equations:

(1) $VA3=VA1-Vd$ (2) $VA2p=VA1-Vd$ (3) $VA2n=VA1+Vd$ (4) $VA4p=VA2p-Vd=VA1-2Vd$ (5) $VA4n=VA2n-Vd=VA1$ where V$d$ represents the above-described forward voltage drops,
VA1 represents the voltage at the terminal A1,
VA2$p$ represents the voltage at the terminal A2 when the slope of the voltage is positive,
VA2$n$ represents the voltage at the terminal A2 when the slope of the voltage is negative,
VA3 represents the voltage at the terminal A3,
VA4$p$ represents the voltage at the terminal A4 when the slope of the voltage is positive, and
VA4$n$ represents the voltage at the terminal A4 when the slope of the voltage is negative.

Verification of these equations may best be obtained from an analysis of the voltages VA1, VA2, VA3 and VA4 available at the terminal A1, A2, A3, and A4 and corresponding explanations of how those voltages are obtained.

Figure 2:
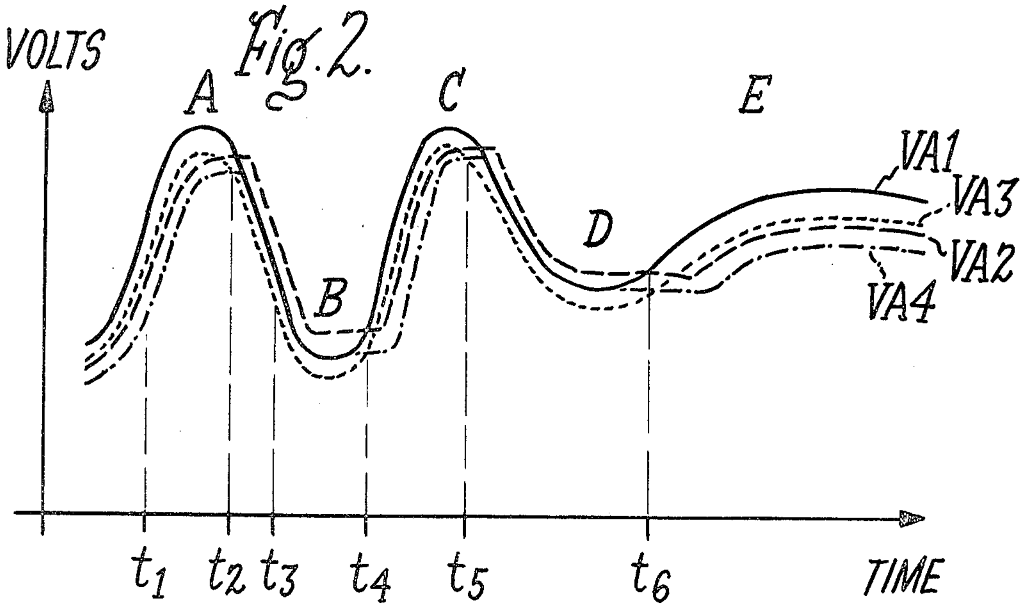
FIGURE 2 is a diagrammatic illustration comparing the signals available at various points in the circuit in FIGURE 1 as a function of time.

The four voltages VA1, VA2, VA3, and VA4 are depicted in FIGURE 2 as comprising a peak A, a valley B, a peak C, a valley D, and an ambient peak E, with the orthogonal axes representing voltage and time. At a time $t_1$, the voltage VA2 is of a positive slope and may be seen to substantially satisfy Equation 2. The rate of change in the slope at the time $t_1$ is sufficiently small to allow the voltage VA2 to follow the voltage VA1 rather closely as controlled by the resistor 10 and the capacitor 11 while maintaining a substantially constant voltage differential V$d$ across the diode 8. Similarly, the voltage VA3, at the time $t_1$, may be seen to be equal to the voltage VA1 less a constant voltage differential equal to the forward voltage drop across the diode 8. The forward voltage drop across the base-emitter circuit of the transistor 15 is sufficient to establish a differential voltage $VA3-VA4p$ at the signal comparison means 44 which is equal to a plus V$d$.

At a time $t_2$, the voltage VA1 produces a cross-over between the voltages VA3 and the lagging voltage VA4 at the terminal A4, which cross-over occurs very close to the peak A. The cross-over, which is caused by the integration of the voltage at the terminal A2, will produce a change in state in the signal comparison means 44, nonconduction through the diode 8, and conduction from the emitter terminal A2 to the base of transistor 9.

At a time $t_3$, when the voltage VA1 is of a negative slope, the voltage VA2 at the terminal A2 satisfies Equation 3 where the differential V$d$ represents the forward voltage drop across the base-emitter circuit of the transistor 9. Since the voltage VA2$n$ follows behind the voltage VA1, the differential V$d$ is now positive. Because the differential is positive, the voltage VA4$n$ equals the voltage VA1 due to the cancellation of the voltage drop across the emitter-base circuit of the transistor 15. The differential at the signal comparison means 44, $VA3-VA4n$ now equals a minus V$d$.

At a time $t_4$, corresponding to the valley B the critical cross-over between the voltages V3 and V4 again occurs. The cross-over which is again caused by the integration of the voltage VA2 results in a change in state in the signal comparison means 44, conduction through the diode 8, and nonconduction from the emitter terminal A2 to the base of the transistor 9. The detector is thus reset to detect the next peak.

At a time $t_5$, the cycle as described with respect to the time $t_1$, will reoccur with detection at the peak C and reset at the valley D. Note that even though the valley D is of a somewhat long duration, the rate of change in the slope of the voltage VA1 is sufficient to produce the critical cross-over for reset. Also, note that the ambient peak E does not produce the critical cross-over between the voltages VA3 and VA4 thereby rendering the peak detector insensitive to peaks of this duration.

Figure 3:
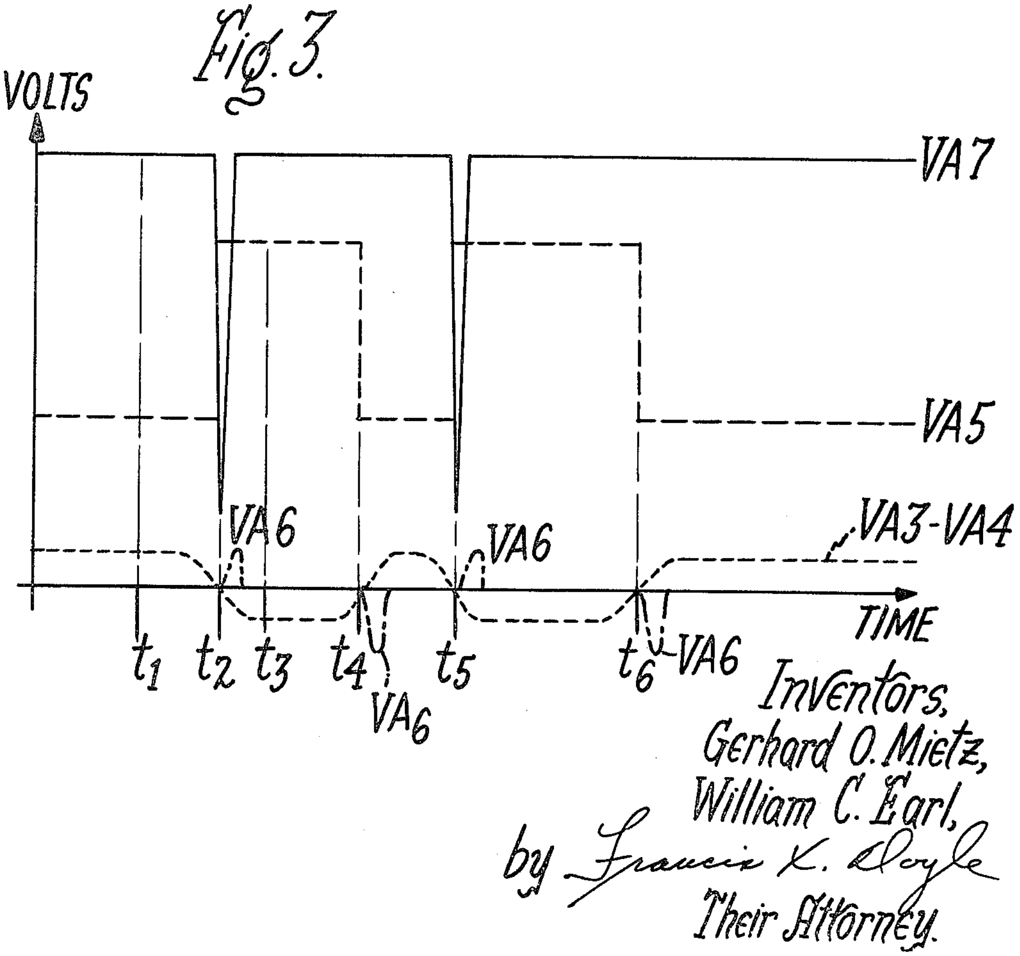
FIGURE 3 is a diagrammatic illustration of the signals available at other points in the circuit of FIGURE 1 as a function of time.

The voltages available in the output circuit of the peak detector as compared with the differential voltage available at the signal comparison means 44 are shown in FIGURE 3. The differential voltage $VA3-VA4$ is represented as an A-C function on the time axis with the critical cross-over times $t_2$, $t_4$, $t_5$, and $t_6$ so designated. When the differential voltage $VA3-VA4$ is operated upon by the signal comparison means 44, an output voltage VA5 will appear at the terminal A5 which is a pulsating wave shape as shown. The signal comparison means drives the terminal A5 to a more positive potential at the cross-over time $t_2$ which corresponds to the first peak A. The positive going pulse will be sustained until cross-over occurs again, at the time $t_4$, which corresponds to the valley B. A positive going pulse will occur again at the cross-over time $t_5$ which corresponds to the peak C and will be sustained until the cross-over time $t_6$ corresponding to the valley D.

Until the time $t_2$, the voltage VA5 will maintain the transistor 32 in its nonconducting state thereby resulting in a voltage VA5 appearing across capacitor 33 with an essentially zero voltage appearing across the resistor 34 and a substantially zero voltage VA6 at the terminal A6. At the time $t_2$, the positive pulse in the voltage VA5 will be differentiated by the resistor 34 and the capacitor 33 effecting a rise in the voltage VA6 at the terminal A6 for a short period of time. The rise in voltage results in conduction through the transistor 32 and an impulse function in the form of a reduced voltage at the terminal A7, which voltage is represented by the wave shape VA7.

At the time $t_4$, the drop voltage VA5 will drop the voltage VA6 to a negative potential until the capacitor 33 discharges through the resistor 34. Of course, the negative voltage VA6 will not cause conduction of the transistor 32 thereby avoiding detection of the valley B.

Similarly, the voltage VA6, at the time $t_5$ corresponding to the peak C, can cause a positive pulsation of the voltage VA5 effecting an impulse function in the voltage VA7 and thereby indicating a peak. The valley D appearing at the time $t_6$ will go undetected since the negative voltage VA6 will not cause conduction of the transistor 32 to effect an impulse in the voltage VA7.

The embodiment of the invention described above may be seen to provide a selective peak detection insensitive to noise signals, ambient signals, and valleys occurring in an input signal over a wide amplitude range. It is appreciated that valleys or inverse peaks may in some cases, require detection, and substitution of an output circuit sensitive to negative pulses at the terminal A6 may accomplish this.

Although a specific embodiment of the invention has been shown and described, it is not desired that the invention be limited to the particular form shown and described and it is intended by the appended claims to cover all modifications within the spirit and scope of the invention.

What is claimed as new and desired to be secured by Letters Patent of the United States is:

1. A peak detector comprising:
(a) an input circuit for receiving an input signal;
(b) an integration means;
(c) a first switching means with a first output terminal connected to said integration means;
(d) a signal comparison means having a first input and a second input;
(e) a first rectifying means for a first component of the input signal connecting said input circuit to said integration means and said first output terminal;
(f) a second rectifying means for a second component of the input signal connecting said input circuit to said second input;
(g) a connective means between said first output terminal and said first input to apply said first component of said input signal to said signal comparison means to produce a peak indicative signal at an output of said signal comparison means.

2. The peak detector as recited in claim 1 wherein said first switching means comprises a first transistor including an emitter terminal corresponding to said first output terminal and a base terminal connected to said input circuit, said first transistor having a predetermined base-emitter forward voltage drop.

3. The peak detector as recited in claim 2 wherein said first rectifying means comprises a first diode and said second rectifying means comprises a second diode, said first diode and said second diode having forward voltage drops equal to said predetermined forward voltage drop.

4. The peak detector as recited in claim 3 wherein said connective means comprises a second transistor base-emitter circuit with a forward voltage drop equal to said predetermined forward voltage drop.

5. The peak detector as recited in claim 1 wherein said input circuit comprises a low pass filter.

6. The peak detector as recited in claim 1 wherein said signal comparison means comprises a switching differential amplifier including said output.

7. The peak detector as recited in claim 1 wherein said integration means comprises a parallel RC combination.

8. The peak detector as recited in claim 6 comprising an output circuit including signal differentiation means connected to said output of said switching differential amplifier.

9. The peak detector as recited in claim 8 wherein said output circuit further comprises a second switching means with a control terminal and a second output terminal, said control terminal connected to said output of said signal differentiation means to produce a peak indicative signal at said second output terminal.

References Cited

UNITED STATES PATENTS

| | | | |
|---|---|---|---|
| 2,834,883 | 5/1958 | Lukoff | 328—135 X |
| 2,952,811 | 9/1960 | Carr | 328—150 X |
| 3,348,065 | 10/1967 | Schmidt | 307—235 X |

JOHN S. HEYMAN, Primary Examiner

STANLEY D. MILLER, Assistant Examiner

U.S. Cl. X.R.

307—229, 264; 328—127, 146, 150